US010330486B2

(12) United States Patent
Grimm et al.

(10) Patent No.: US 10,330,486 B2
(45) Date of Patent: Jun. 25, 2019

(54) CONTEXT-AWARE VEHICLE COMMUNICATIONS SYSTEM AND CONTROL LOGIC WITH ADAPTIVE CROWD-SENSING CAPABILITIES

(71) Applicant: GM GLOBAL TECHNOLOGY OPERATIONS LLC, Detroit, MI (US)

(72) Inventors: Donald K. Grimm, Utica, MI (US); Fan Bai, Ann Arbor, MI (US); David E. Bojanowski, Clarkston, MI (US); Omer Tsimhoni, Bloomfield Hills, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 85 days.

(21) Appl. No.: 15/671,935

(22) Filed: Aug. 8, 2017

(65) Prior Publication Data
US 2019/0049262 A1 Feb. 14, 2019

(51) Int. Cl.
*G01C 21/34* (2006.01)
*G01C 21/36* (2006.01)

(52) U.S. Cl.
CPC ..... *G01C 21/3484* (2013.01); *G01C 21/3415* (2013.01); *G01C 21/3492* (2013.01); *G01C 21/3697* (2013.01)

(58) Field of Classification Search
CPC ............ G01C 21/3484; G01C 21/3415; G01C 21/3492
USPC ......................................................... 701/418
See application file for complete search history.

(56) References Cited

U.S. PATENT DOCUMENTS

| 7,825,824 | B2 * | 11/2010 | Shrum, Jr. | ............. G08G 1/127 340/506 |
| 8,712,650 | B2 * | 4/2014 | Koebler | ............. B60L 15/2045 701/51 |
| 8,880,240 | B2 | 11/2014 | Grimm et al. | |
| 9,430,944 | B2 * | 8/2016 | Grimm | ............. H04L 67/22 |
| 9,475,500 | B2 | 10/2016 | Grimm et al. | |
| 9,832,610 | B2 * | 11/2017 | Herz | ............. H04W 4/029 |
| 2013/0059607 | A1 * | 3/2013 | Herz | ............. H04W 4/029 455/456.3 |
| 2013/0103779 | A1 | 4/2013 | Bai et al. | |

(Continued)

*Primary Examiner* — Yazan A Soofi
(74) *Attorney, Agent, or Firm* — Quinn IP Law (57) ABSTRACT

Disclosed are vehicle communications networks for adapting user information using crowd-sensed contextual data, computer-executable instructions for provisioning such content/information, and vehicles equipped with a telematics system for adapting driver information using contextual data from vehicle participatory sensing systems. A disclosed method for provisioning information to occupants of a motor vehicle includes determining trip characteristics, including vehicle and driver data, for a current trip of the vehicle, and determining trip characteristics for previous trips that correspond to the current trip. The vehicle's communications system receives, over a distributed computer network from a vehicle participatory sensing system aggregating data from participative vehicles, operational data for the current trip as sensed by the participative vehicles. The received operational data is analyzed with the current and previous trip characteristics to determine a predicted trip duration and/or a predicted trip route. An electronic user interface of the vehicle outputs the predicted trip duration and/or route.

20 Claims, 3 Drawing Sheets

(56) References Cited

U.S. PATENT DOCUMENTS

| | | |
|---|---|---|
| 2015/0181306 A1 | 6/2015 | Innes et al. |
| 2015/0274177 A1* | 10/2015 | Payne ................ B60H 1/00771 701/1 |
| 2016/0019651 A1* | 1/2016 | Grimm .................. G06Q 40/08 705/4 |
| 2016/0044519 A1 | 2/2016 | Bai et al. |
| 2016/0216130 A1* | 7/2016 | Abramson ......... G01C 21/3626 |
| 2018/0080777 A1* | 3/2018 | Nimchuk ........... G01C 21/3415 |

* cited by examiner

FIG. 3

CONTEXT-AWARE VEHICLE COMMUNICATIONS SYSTEM AND CONTROL LOGIC WITH ADAPTIVE CROWD-SENSING CAPABILITIES

INTRODUCTION

The present disclosure relates generally to networked data systems for provisioning information to occupants of motor vehicles. More specifically, aspects of this disclosure relate to an in-vehicle telematics architecture using crowd-sourced data from vehicle participatory sensing systems to adapt occupant information.

Current production motor vehicles, such as the modern-day automobile, are originally equipped or retrofit with various types of onboard electronic devices for transferring information to and from vehicle occupants. In automotive applications, for example, passenger cars are outfitted with an instrument cluster that communicates information to the driver regarding such things as vehicle speed, engine speed, fuel level, powertrain operating conditions, and other vehicle-related data. In addition to the instrument cluster, many vehicles also include as standard equipment an onboard audio system that operates alone or in conjunction with peripheral hardware to play music, output navigation instructions, receive voice commands, and provide other audio-related functionality. Some motor vehicles are now equipped with a graphical user interface, such as a touch-screen video display panel, that is positioned in a center stack of the passenger compartment and operable to receive user inputs and display image, text, and video-based content. In-vehicle audiovisual (AV) hardware that delivers entertainment and informational content from resident and remote sources is collectively referred to in the art as an integrated vehicle "infotainment" or "telematics" system.

Onboard vehicle devices may communicate content that is based, for example, on data received from a local device, such as a networked vehicle controller, smartphone, laptop, or digital audio file player, as well as data received from a remote device, such as a radio transmitter, GPS navigation transceiver, or satellite broadcast service. Some devices are even able to receive data from a distributed computer network—the most ubiquitous being the global Internet—over a wireless fidelity (WiFi) system, cellular network, or other wireless data exchange technology. Content that is output based on data received over a wireless network may include, for example, video (e.g., streaming television, movies, video clips, etc.), audio (e.g., Internet radio, podcasts, audio books, etc.), print media, social media, mobile phone media, and innumerable other types of information. Many vehicles now support seamless integration of a smartphone with the vehicles' infotainment systems, which allows occupants to access email, the World Wide Web, and, of course, make and receive phone calls.

To improve vehicle operation and occupant experience, most automobiles are now furnished with sensing systems for monitoring a wide range of parameters related to the vehicle's occupants and passenger compartment, operating state, and surrounding environment. For instance, a vehicle dynamics system uses sensors to monitor a vehicle's dynamic state (e.g., speed, acceleration, yaw, pitch, slip, etc.), while a proximity sensor system can detect objects and other vehicles on and around an automobile. Operating states related to the vehicle's engine, transmission, brake system, steering system, fuel system, and airbags can be determined through a distributed network of in-vehicle sensors. At the same time, modern vehicle telematics systems regularly transmit data to and receive data from a centralized database system. These telematics systems gather vehicle data for specific purposes, such as detecting airbag deployment in the vehicle and automatically requesting emergency services. More recently, data is being collected from a large number of participating vehicles, and this data is being used to identify a wide range of traffic and road conditions for dissemination to other vehicles within a designated geographic locale.

SUMMARY

Disclosed herein are vehicle communications networks, vehicle participatory sensing (VPS) systems, and related control logic for adapting user content and information using crowd-sensed contextual data. Also disclosed are methods and computer-executable instructions for provisioning such content/information, and motor vehicles equipped with an enhanced AV telematics system for adapting driver information using crowd-sensed contextual data from a VPS system. By way of example, there is presented a novel method of presenting driver information, such as predicted trip duration and recommended trip routing, based on time context and location context that is derived from crowd-sensed data. This method may be implemented to enable an adaptive human machine interface (HMI) to present real-time data based on time context (e.g., rush hour vs. midday travel, nighttime vs. daytime travel, etc.) and location context (familiar vs. unfamiliar area, on-commute vs. off-commute, etc.). Disclosed vehicle communications systems may adapt driver information based on crowd-sensed contextual data to provide driver support based on vehicle operational domain and driving context. The system may employ real-time sensor monitoring with predictive data analytics to correlate current trip time/route to previous duration/trip patterns, and characterize overall timeliness and routing. This helps to enable intelligent adaptations to the HMI based on time and location context using data that is derived from other vehicles acting as a distributed network of sensors.

Attendant benefits for at least some of the disclosed concepts include adaptable HMI hardware and attendant control logic that provides driver support based on operational domain, vehicle data and driver context. Disclosed architectures also enable the system to adapt crowd-sensing data fidelity/accuracy and sampling based on user needs (individual needs/wants) and, when desired, context feedback (group needs/wants). Aspects of the disclosed concepts also enables the in-vehicle HMI to customize the presentation of crowd-sourced events/info based on time and/or trip context. Another attendant benefit may include enabling a user experience that is aligned with the current driving context, which results in increased satisfaction due to increased knowledge of the driver and the time and environmental context.

Aspects of the present disclosure are directed to control logic and computer-executable instructions for adapting user content and information using crowd-sensed contextual data. Disclosed, for example, is a method for provisioning information to an occupant of a motor vehicle, which includes an electronic user interface (EUI), a vehicle controller governing operation of the EUI, and a vehicle communications system wirelessly connecting the vehicle controller and EUI to a distributed computer network. The representative method includes, in any order and in any combination with any of the disclosed features and options: determining, e.g., via the vehicle controller, current trip characteristics, such as vehicle data and driver data, for a current trip of the motor vehicle; determining, via the vehicle controller, previous trip characteristics, such as time data and routing data, for one or more previous trips of the motor vehicle corresponding to the current trip; receiving, via the vehicle's communications system over the distributed computer network from a VPS system aggregating data from multiple participative vehicles, operational data for the current trip as sensed by the participative vehicles; analyzing the received operational data with the current trip and previous trip characteristics to determine a predicted trip duration and/or a predicted trip route; and directing the EUI to display or otherwise output the predicted trip duration and/or route determined from the analyzed operational data.

Any of the disclosed systems, methods or devices may be configured to adapt the fidelity and/or sampling frequency of the received operational data based, e.g., on one or more user expectations of the vehicle's driver and/or one or more aggregate expectations of a group of the participative vehicles. Optionally, presentation of the predicted trip duration (time) and/or trip route (location) may be adapted based on time context data and/or location context data. Operational data may be composed of driving related conditions, such as ambient lighting conditions data, road surface conditions data, traffic conditions data, weather conditions data, unexpected driving scenarios data, and/or driving intersection data collected by the participative vehicles. Vehicle data may be composed of the operating states for various vehicle systems of the motor vehicle during the current trip, such as stability control active/inactive, GPS available/unavailable, adaptive cruise control (ACC) active/inactive, etc. Driver data may be composed of the driver-specific operating characteristics for various driving variables of the driver during the current trip, such as defensive or aggressive driver, tendency to speed and/or tailgate, number of driving violations, etc. Driver data may also include contextual data such as an indication of whether or not the current trip is on or off commute, in a familiar or an unfamiliar location, and/or a frequent or infrequent trip type. The EUI may optionally display or otherwise output an indication of whether the vehicle's current trip is predicted to be early, on time, or late based on a comparison between the predicted trip duration, which is based on driver, vehicle and operational data, and historical trip duration data received from the VPS system, which is based on participatory vehicle sensed information.

Other aspects of the present disclosure are directed to motor vehicles equipped with an AV telematics system for adapting driver information using crowd-sensed contextual data from a VPS system. A "motor vehicle," as used herein, may include any relevant vehicle platform, such as passenger vehicles (ICE, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with a passenger compartment, and an AV telematics unit mounted within the passenger compartment to transmit audio and/or video information to one or more occupants of the vehicle. A vehicle communications system, which is mounted to the vehicle body, is operable to wirelessly connect the AV telematics unit to a distributed computer network, such as a cloud computing system or mass data storage entity.

Continuing with the above example, the motor vehicle also includes an AV electronic control unit (ECU) that is communicatively connected to the AV telematics unit and the vehicle communications system. This AV ECU is programmed to access, receive or otherwise determine current trip characteristics, including vehicle data and driver data, for a current trip of the vehicle, and previous trip characteristics for multiple previous trips of the vehicle that correspond to the current trip. The AV ECU receives, via the vehicle's communications system from a VPS system, operational data for the current trip as sensed by the participative vehicles registered with the VPS system. The ECU then processes or otherwise analyzes the received operational data with the current and previous trip characteristics to determine a predicted trip duration and/or a predicted trip route. The AV telematics unit outputs the predicted trip duration and/or trip route to the occupant(s) of the motor vehicle.

Additional aspects of the present disclosure are directed to non-transitory, computer readable media storing instructions for execution by one or more processors of a resident or remote vehicle controller. These instructions, when executed, cause the controller to perform various steps, including: determining current trip characteristics including vehicle data and driver data for a current trip of the motor vehicle; determining previous trip characteristics for one or more previous trips of the motor vehicle corresponding to the current trip; receiving, via the vehicle communications system over the distributed computer network from a vehicle participatory sensing system aggregating data from multiple participative vehicles, operational data for the current trip as sensed by the participative vehicles; analyzing the received operational data with the current trip characteristics and the previous trip characteristics to determine a predicted trip duration and/or a predicted trip route; and directing the EUI to output to the occupant of the motor vehicle the predicted trip duration and/or trip route determined from the analyzed operational data. These CRM instructions may be supplemented, combined or otherwise modified to carry out any of the other disclosed features and functions.

The above summary is not intended to represent every embodiment or every aspect of the present disclosure. Rather, the foregoing summary merely provides an exemplification of some of the novel concepts and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Disclosed HMI architectures and vehicle communication systems are configured, as explained in extensive detail below, to adapt the content and information relayed to the driver based on crowd-sensed contextual data using participative vehicles as sensors to generate contextual information. For instance, additional driver support may be provided based on the vehicle's operational domain and driving context: the system correlates current time information to previous trip patterns, and characterizes estimated overall timeliness for a current trip; the system correlates current trip information to previous trip patterns and characterizes location context data. With this information, the system is able to adapt crowd-sensing data fidelity (e.g., compress or expand data, reduce or increase number of data parameters, modify data accuracy (e.g., number of decimal points)) and sampling frequency (number of sensor readings per participating vehicle per designated time frame) based on user needs (individual driver needs/wants) and context feedback (group needs/wants). The system may also customize the presentation of crowd-sourced events/info based on time and/or trip context, on/off commute, familiar/unfamiliar locale, low/high fidelity data, low/high sampling rate, etc.

The concept of Operational Domain may define the conditions that a vehicle will experience during a particular trip, including: ambient lighting conditions (e.g., low, high, etc.); unexpected driving scenarios (e.g., traffic, accident, emergency vehicle, etc.); road surface conditions (e.g., wet, icy, gravel, etc.); road type (e.g., pot holes, road work, etc.); ambient weather conditions (e.g., fog, rain, snow, sleet, etc.), road junction (e.g., approaching a stop sign, an intersection, an off ramp, a turning location, etc.). Disclosed vehicle HMIs may be leveraged to employ this information and provide improved vehicle drivability and user experience (e.g., adapt warning timing under adverse road surface conditions). Disclosed crowd sensing systems can support the definition of new types of contextual information, i.e., characterization of vehicle trips in new dimensions (e.g., location: on/off commute, familiar/unfamiliar, vacation, errands, etc.; time pressure: "running early", "on-time", "running late").

In a characterization of time scenario, the system may correlate current time (trip duration) to: previous trips to determine typical start and end times; VPS crowd-sensed traffic and environment to determine timeliness along route; crowd-sensed historical trip data, e.g., to determine if the driver on the current trip will likely be "running early" or will be "on time" or may be "running late," under various scenarios. Driver presentation and vehicle calibration can be adapted based on detection of extra time (Time Comfort) or time pressure (Time Anxiety). With these VPS data-based techniques, for example, there are opportunities for implementing "Time Comfort" scenarios, e.g., where the system may suggest an opportunistic errand or refueling stop ("You have plenty of time!" messaging), as well as opportunities for implementing "Time Anxiety" scenarios, e.g., where the system implements calming measures (e.g., "Drive safely, there are potential hazards!"). Automated vehicle features may include automatically adapting one or more of the vehicle's safety system settings to provide increased protection in a "Time Anxiety" scenario. The vehicle may also optimize travel time by suggesting, e.g., a fuel station stop based on crowd-sensed visits, or delay non-essential driver information (e.g., change oil soon, other reminders) under stressful driving situations.

In a characterization of time scenario, the system may correlate a current trip to previous trip patterns to determine a "preferred" current trip route, e.g., based on whether the vehicle is: on a daily commute or off daily commute, in a familiar or an unfamiliar location, if the trip route is an "other" type (a one-off trip, a vacation, an errand), etc. Context information from other participatory vehicles may be considered in operation of system, and overall system function (e.g., fidelity, sampling, etc.) may be adapted based on individual and/or group user needs. In an "on commute" example, the system may provide enhanced crowd-sensed traffic data to the vehicle's HMI, with high-resolution data and high severity crowd-sourced events, while suppressing non-essential information. By way of comparison, in an "off commute" scenario, the system may provide enhanced routing services and options, and provide notifications about anomalous events irrespective of severity level. For an "on vacation" scenario, the system may be enabled to provide enhanced location services (e.g., notifications of popular attractions, available parking areas, highly rated restaurants, etc.). For an "unfamiliar location" scenario, the system may provide enhanced navigation services (e.g., sharp curves, sun angles, etc.). The system may also combine time and location characterization, for example, to suggest services (e.g., "Low oil, you seem to have time on Monday mornings . . . ") and to suggest attraction visits (e.g., "Very popular monument ahead; typical 15-minute stay . . . ").

Any of the disclosed HMI services may be governed, in whole or in part, via an HMI policy engine. Some potentially important dimensions of Context Domain that are employed by the HMI policy engine may include: commute vs. leisure; other occupants vs. driving alone; time pressure vs. time comfort; trip length/duration; familiar location vs. unfamiliar location; vehicle owned vs. vehicle rented; conventional domains (weather, driver state, etc.). Some important dimensions of the HMI policy include, in some non-limiting examples: visual information; visual warnings; auditory information; auditory warnings; haptic information/warning; active route reminder; inactive route reminder; activation and notification, etc. Some representative examples are provided in the table below:

| Context 1 | Context 2 | Context 3 | Context 4 | Policy 1 | Policy 2 |
|---|---|---|---|---|---|
| Commute | Running Late | Alone + Drowsy | Own | Suppress LBS | Auditory Alerts |
| Vacation | On Time | Family | Share | Active LBS | Haptic Alerts |
| Off Commute | Running Early | Alone | Own | Suggest Fuel near Highway | Center Stack notification |

Driving context may include numerous conditions that are present in a current driving task or a previous driving task (e.g., for historical reference purposes). This may include, but is not limited to, driver behavior under certain ambient light conditions, driver behavior under certain road surface conditions, driver behavior under certain weather conditions, driver behavior on certain types of road (e.g., residential, arterial, freeway), driving speed, current or upcoming driving maneuvers, etc.

Figure 1:
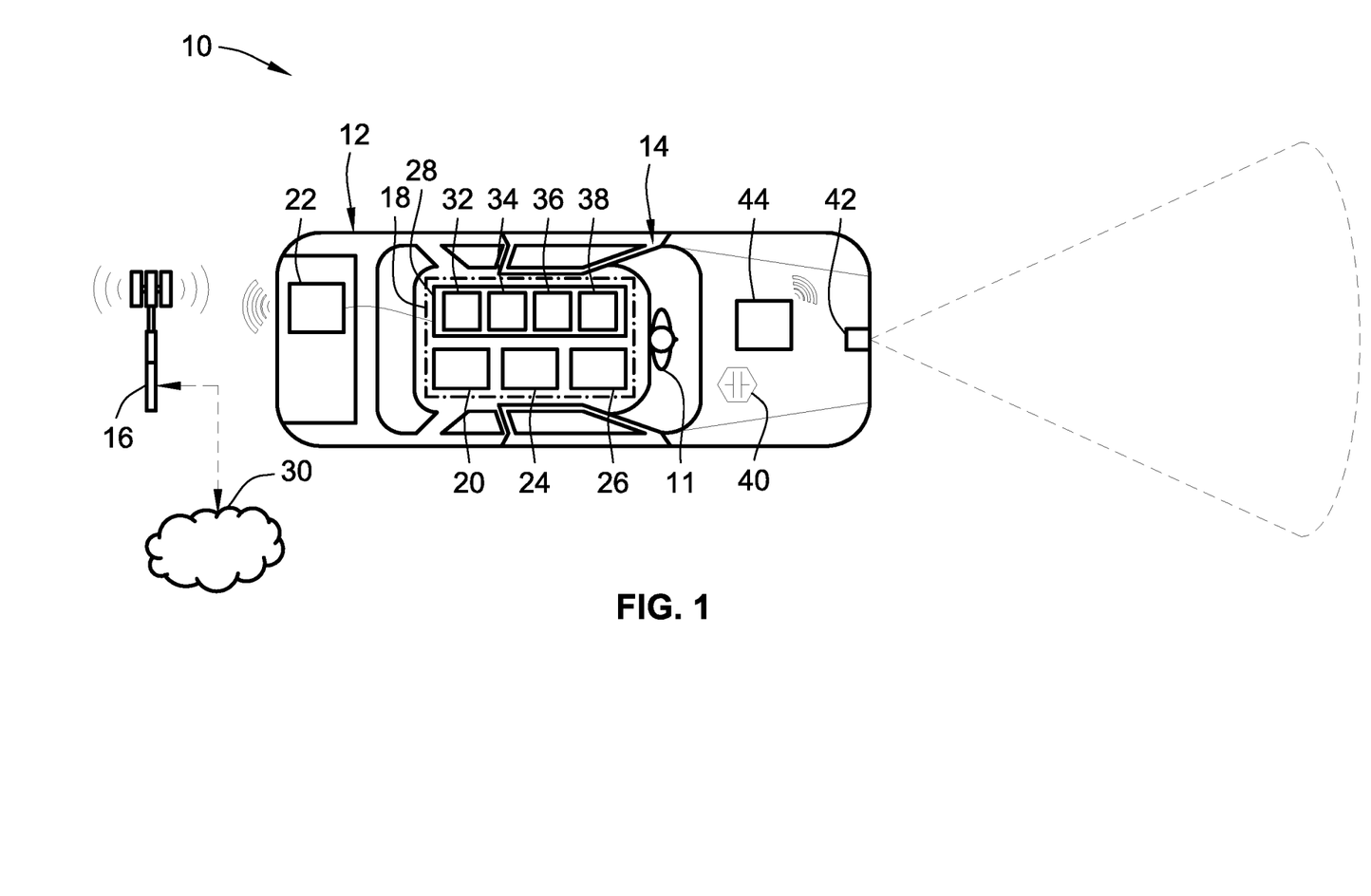
FIG. 1 is a partially schematic plan-view illustration of a representative motor vehicle equipped with an AV telematics system having participative sensing communication capabilities in accordance with aspects of the present disclosure.

Referring now to the drawings, wherein like reference numbers refer to like features throughout the several views, there is shown in FIG. 1 a partially schematic illustration of a representative automobile, which is designated generally at 10 and portrayed herein for purposes of discussion as a four-door sedan-style passenger vehicle. Mounted to the body 12 of the automobile 10, e.g., within a center stack of a passenger compartment 14, is an adaptive HMI in the form of an AV telematics unit 18 with participative sensing capabilities. The illustrated automobile 10—also referred to herein as "motor vehicle" or "vehicle" for short—is merely an exemplary application with which novel aspects and features of this disclosure may be practiced. In the same vein, implementation of the present concepts into a center console telematics unit for displaying driver information should also be appreciated as an exemplary application of the novel concepts disclosed herein. As such, it will be understood that aspects and features of the present disclosure may be adapted to any desired user content and information, implemented into other HMI architectures, and utilized for any logically relevant type of motor vehicle. Lastly, the drawings presented herein are not necessarily to scale and are provided purely for instructional purposes. Thus, the specific and relative dimensions shown in the drawings are not to be construed as limiting.

In the representative framework presented in FIG. 1, the vehicle's telematics unit 18 is part of a distributed computer network operable for transacting data over a communications network 16 using onboard ("in-vehicle") electronic devices and off-board ("remote") electronic devices. The communications network 16 of FIG. 1 can be a wired network or a wireless network, or a combination of wired and wireless technology. It may be desirable, for at least the illustrated example, that most if not all of the transactions performed by the AV telematics unit 18 be conducted "wirelessly" over a wireless configuration of the communications network 16, such as a WLAN or cellular data network, to ensure freedom of movement of the driver and any occupants of vehicle 10. As shown, an AV controller 20, which may be resident to or remote from the body 12 of the vehicle 10, communicates through a vehicle communications system 22 with one or more remote sources of content and information, such as a vehicle participatory sensing (VPS) system 30. VPS system 30 communicates with and aggregates data from multiple participative vehicles, then transmits accumulated and analyzed operational data sensed by and retrieved from these participative vehicles to the telematics unit 18. The term "operational data," as used herein, may include ambient lighting conditions, road surface conditions, traffic conditions, weather conditions, unexpected driving scenarios, and/or driving intersection data. The illustrated example portrays a single occupant—vehicle driver 11—interacting with the vehicle 10 by way of telematics unit 18 through operation of one or more input devices 24, such as a microphone, a button panel, knobs, dials, and/or a touchscreen display panel, and one or more output devices 26, which may be in the nature of audio speaker components, a video display panel, a heads-up display (HUD), etc. It is envisioned, however, that the vehicle's telematics architecture 18 may interact with any occupant of vehicle 10, and may employ any now available or hereafter developed electronic input and output devices.

In the illustrated architecture, the communications system 22 securely communicatively couples the AV controller 20 to one or more VPS system servers operable for provisioning remote sources of data and content. Each server can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers can each be part of a logical group of one or more servers, such as a server farm or server network or server stack. As is typical in large-scale systems, the application software can be implemented in components, with different components running on different server computers, on the same server, or any logical combination thereof. A server stack may include any suitable processor(s), such as those made by Intel and AMD, which communicates with an auxiliary or main memory device.

Figure 2:
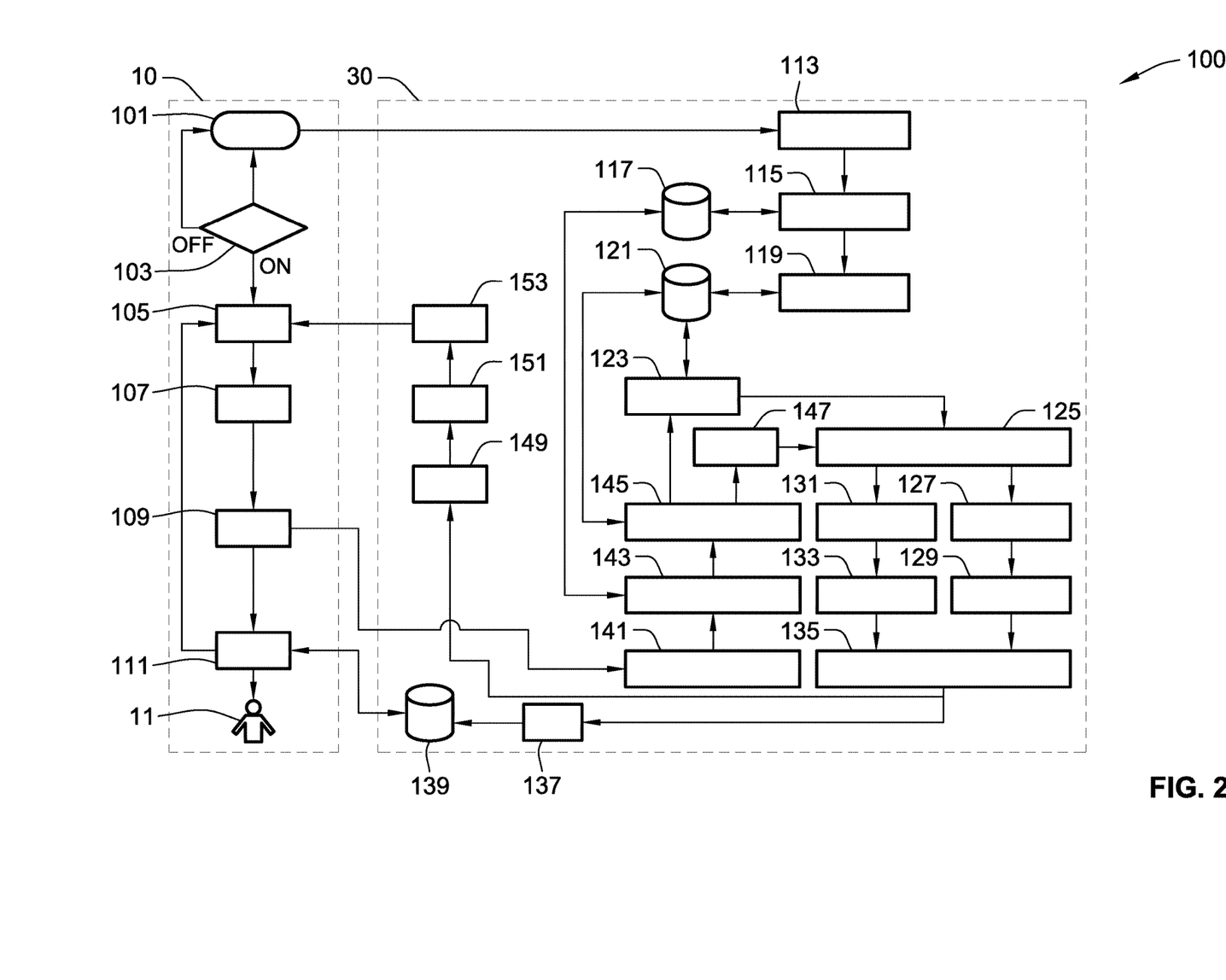
FIG. 2 is a flowchart of a representative algorithm for adapting driver information based on time context and location context derived from crowd-sensed VPS data that may correspond to instructions executed by onboard control-logic circuitry, programmable electronic control unit, or other computer-based device of a motor vehicle in accord with aspects of the disclosed concepts.
Figure 3:
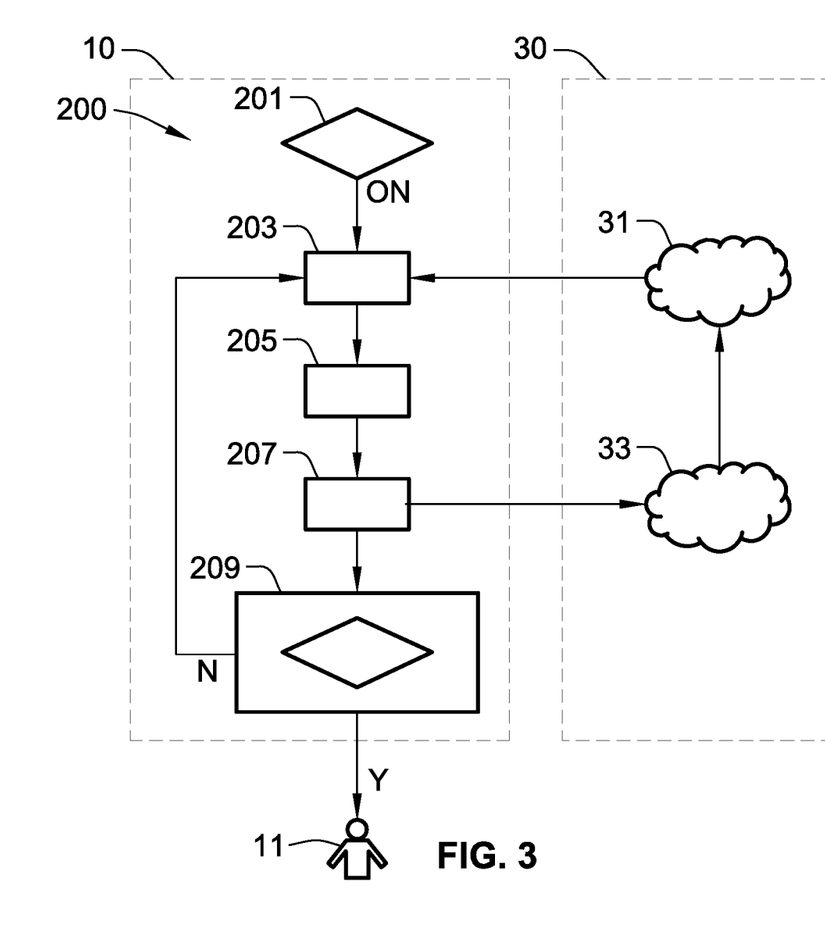
FIG. 3 is a flowchart for a representative location-context based notification protocol that may correspond to instructions executed by onboard control-logic circuitry, programmable electronic control unit, or other computer-based device of a motor vehicle in accord with aspects of the disclosed concepts.

AV telematics unit 18 of FIG. 1 is operable to access and store, e.g., on a resident or remote memory device 28, control logic and software with computer-executable instructions, such as those presented in FIGS. 2 and 3, for implementation by one or more processors of the controller 20. This memory device 28 may take on the form of any of a variety of computer hardware media, such as CD-ROM, flash, magnetic disk, bubble, volatile and non-volatile semiconductor memory (e.g., various types of read-access memory (RAM) or read-only memory (ROM)), as well as virtual and cloud storage media, etc. One of the stored program modules of the memory device 28 may include a status module 32 that collects data through a data communications bus regarding the status of virtually any vehicle system. For example, the vehicle system status module 32 can determine vehicle operating conditions such as: windshield wipers on or off or intermittent; headlights off or on (low beam or high beam); throttle position; brake pressure; anti-lock brake system (ABS) activated; traction control system (TCS) activated; airbag deployment; seat occupancy or vacancy; steering wheel position; ambient temperature; infotainment system usage; in-vehicle cell phone usage;

HVAC system settings; etc. The data collected by the system status module 40 may be used to identify many different types of driving situations and conditions.

Memory device 28 of FIG. 1 also stores a vehicle dynamics module 34 that collects vehicle dynamics data and other vehicle-motion related parameters, e.g., through communication with a distributed array of motion sensing devices, such as one or more dynamics sensors 40. Representative examples for sensor 40 include wheel speed sensors, longitudinal, lateral and vertical accelerometers, and a yaw, roll, and/or pitch rate sensors, etc. The dynamics sensors 40 may also include wheel load sensors and other types of sensors. The vehicle dynamics module 34 collects data from all of the sensors 40 and performs calculations as necessary to provide a representation of the dynamic conditions of the vehicle 10—including positions, velocities, accelerations and forces affecting the vehicle 10. An object detection module 36 receives data from one or more proximity sensors 42 that use photo detection, radar, laser, infrared, or some other type of object detection technology, including short range communications technologies such as Dedicated Short-Range Communications (DSRC) or Ultra-Wide Band (UWB). Using data from the sensor(s) 42, the object detection module 36 identifies objects in the vicinity of the vehicle 10, including object size, angle of approach, speed, etc. While illustrated with a single dynamics sensor 40 and a single proximity sensor 42, multiple sensors may be employed for each subsystem, including sensors packaged at other locations, including with a forward-view, rearward-view and side-view proximity sensors.

With continuing reference to FIG. 1, automobile 10 is optionally equipped with a vehicle-to-everything (V2X) communications module 38, e.g., for communicating with other, similarly-equipped vehicles within communications range, using a DSRC device 44 or other wireless communications technology. The V2X communications module 38 may incorporate more specific types of communication protocols—V2I (Vehicle-to-Infrastructure), V2V (Vehicle-to-Vehicle), V2P (Vehicle-to-Pedestrian), and V2D (Vehicle-to-Device)—to collect data from nearby devices, as may be needed for "smart highway" or autonomous vehicle systems. Data from the various vehicle modules, including vehicle system status module 32, vehicle dynamics module 34, object detection module 36, and V2X communications module 38, may be aggregated via a data collection module, which communicates with a telematics central service via cellular communication towers or other technologies. The other communications technologies may include, but are not limited to, DSRC or other V2I communications, Wi-Fi, Bluetooth®, near field communications (NFC), satellite communications, etc. Depending on the intended application of illustrated telematics system 18, the modules may each be a stand-alone electronic control module or each may be incorporated within another electronic module in the vehicle, as shown, or the various illustrated modules may represent segments of a larger network or system, whether resident to or remote from the vehicle.

With reference now to the flow chart of FIG. 2, an improved method or control strategy for provisioning information to an occupant or occupants of a motor vehicle, such as driver 11 of automobile 10 in FIG. 1, is generally described at 100 in accordance with aspects of the present disclosure. Some or all of the operations illustrated in FIG. 2 and described in further detail below can be representative of an algorithm that corresponds to processor-executable instructions that may be stored, for example, in main or auxiliary or remote memory, and executed, for example, by an on-board or remote ECU, central processing unit (CPU), control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, eliminated, or combined.

Method 100 begins at terminal block 101 with the vehicle (labelled 10 in FIG. 2) calling up an initialization protocol to establish a secure and encrypted wireless communications link with a VPS system (marked as 30 in FIG. 2). As part of this initialization protocol, the vehicle 10 may transmit to the VPS system 30 characteristic information related to a trip the driver 11 intends to commence or, if already begun, intends to complete or, if already finished, for future reference. This information may include the vehicle's current global positioning system (GPS) coordinates or cellular trilateration points to establish the vehicle's point of origin (or current location, e.g., in instances where the trip has already begun). Further examples of information that may be transmitted to the VPS system 30 include a Coordinated Universal Time (UTC) timestamp for the trip's start time, location information for the intended or resultant destination, an intended or completed route or map trace, etc. Vehicle AV controller 20 may detect, monitor, receive, look up, or access (collectively "determine") and transmit other trip-related information characteristic to the current trip, including vehicle-specific data and driver-specific data. The term "vehicle data," as used herein, may include the respective operating state for each of any one or more of the various vehicle systems of the motor vehicle during the trip. As examples, the vehicle may transmit the operating status (active/inactive) for the vehicle's individual safety systems, a fuel tank level or traction battery pack charge level, engine or motor maintenance warnings, etc. The term "driver data," as used herein, may include a respective operating characteristic for each of any one or more driving variables specific to the driver during the trip. For instance, driver data for a particular driver may include indicators that the current trip is: on commute or off commute; in/through a familiar location or an unfamiliar location; a frequent or infrequent trip type, etc.

The method 100 of FIG. 2 continues to decision block 103 to determine if the vehicle's engine ignition or motor starter is in an ON state or an OFF state. If it is determined that the ignition/starter is in an OFF state (Block 103=OFF), the method 100 returns to block 101, any accumulated historical information is transmitted to the VPS system 30, and the process may start again. For instance, a vehicle controller, such as AV controller 20 of FIG. 1, may accumulate previous trip characteristics for one or more previous trips that generally correspond to a current trip of the vehicle. Trip characteristics for such previous trips of a motor vehicle 10 may include a respective start time, a respective start location, a respective trip duration, and/or a respective destination location for each of the previous trips. On the other hand, if the ignition/starter is in an ON state (Block 103=ON), method 100 proceeds to process block 105 where a Data Handler, which functions as a vehicle data entry point, receives or retrieves from the VPS system 30 data that is processed to support one or more designated use cases (e.g., traffic and weather anomalies). At process block 107, a Context Engine, which may be capable of managing the exchange of and storing context-related information, determines a current driving context, e.g., to aid one or more cloud servers of VPS system 30 to determine an expected overall timeliness for a current trip of the vehicle. From this information, the method 100 submits vehicle location and context data, at process block 109, to the remotely located VPS system 30 and to a resident electronic user interface (EUI), such as AV telematics unit 18 of FIG. 1. Then, at process block 111, the EUI displays selected segments of this information to the driver 11. For instance, the AV controller 20 may transmit command signals to the AV telematics unit 18 to output to the driver 11 and any other occupants of the motor vehicle 10 a predicted trip duration and/or a predicted optimal trip route as determined from analyzed crowd-sourced operational data and data accumulated via the vehicle 10. As described above, the AV controller 20, either singly or in cooperation with the VPS system 30, may modify the fidelity and/or sampling frequency of any received crowd-sourced data, e.g., based on one or more user expectations input by the driver 11 and/or an aggregate expectation or set of expectations of a group of the participative vehicles.

Reverting back to the discussion of terminal block 101 and the initialization of the requisite software protocols to establish a VPS communications link, the information accumulated at block 101 may be automatically transmitted to the VPS system 30 when it is determined that the vehicle's prime mover(s) is/are turned off at decision block 103. In this regard, process block 113 may be representative of an "OFF State Receive Handler" module with processor-executable instructions that are invoked when the ignition/starter is powered off. This OFF State Receive Handler may act as the VPS entry point for collected end-of-trip information. Method 100 continues to process block 115 whereat a "Do Map Match" engine helps to determine where the vehicle is located in terms of geographic point of interest (e.g., marked as @home, @work, @grocery, @gas station, etc.). This information is presented to a point of interest (POI) database for processing and storage at input/output procedure 117.

With continuing reference to FIG. 2, the method 100 proceeds to process block 119 to process and analyze the current trip characteristics discussed above with respect to block 101 (e.g., trip start time and location) and store any historical data that has been accumulated (e.g., trip end time, end location, route, etc.). This information is then presented to a trip database for processing and storage at input/output procedure 121. Using information stored in the trip database of 121, a Do Location Context engine is implemented at process block 123 to characterize a current vehicle trip route and, for some implementations, describe the nature of the trip in terms of level of familiarity and type of activity. Examples would include determining that: (1) the driver is/is not on a route that is part of his/her commute (taken every day to work); (2) the driver is/is not on a familiar road (one that has been driven more than a threshold minimum number of times); (3) the driver is/is not on an uncommon route (e.g., running an discrete errand, visiting a new business, attending a sporting event, etc.).

From the Do Location Context engine implemented at block 123, the method 100 proceeds to process block 125 to initiate a Traverse Map Links engine. At this juncture, the VPS system 30 iterates from the origin location to the predicted destination location to estimate how much time it will likely take to traverse each link, and characterize the predicted route in terms of location context (e.g., on commute, commute with errand, etc.). For process block 127, the system 30 will designate or otherwise determine whether the trip is in or passing through a familiar location or an unfamiliar location, is on or off commute, etc. Likewise, process block 129 includes executable instructions to designate or otherwise determine whether the trip is a frequent or infrequent trip type. At process block 131, the VPS system 30 will utilize crowd-sourced contextual data to calculate a time per link, and also determine a time comfort or a time pressure designation for the trip at block 133.

The data that is received, aggregated, processed and/or analyzed (collectively "determined") through process blocks 125, 127, 129, 131 and 133 is fed to a Context Module at process block 135 Context Module 135 performs context feedback and determination whereby participative vehicles report their respective location context data and corresponding vehicle information, and the system incorporates this feedback to adapt the specific data elements that are communicated at a designated resolution and update frequency. By way of example, and not limitation, if there are many participating vehicles with drivers on their daily commute, the VPS system may be tuned to provide higher fidelity traffic and travel time information, while concomitantly suppressing less relevant or less significant information, such as notifications about events that may not be immediately relevant to a specific driver.

Data from the Context Module of process block 135 is fed to an HMI Policy module of process block 137 which accesses policy rules and regulations stored in an HMI policy database at input/output procedure 139. The HMI Policy Module acts as a set of business rules that generally govern how HMI information will be presented. For instance, responsive to an event with a designated Severity Level 1 (least severe), information will be communicated to the driver 11 using only haptic transducers; responsive to an event with a designated Severity Level 2 (severe), information will be communicated to the driver 11 using a simultaneous haptic feedback and auditory alerts; responsive to an event with a designated Severity Level 3 (most severe), information will be communicated to the driver 11 using a haptic, auditory and visual alerts, while vehicle protection systems are automatically upgraded to a higher level of protection. Then, at process block 111, the EUI displays selected segments of this information to the driver 11 and/or other occupant(s) of the vehicle 10. The AV controller 20, either singly or in cooperation with the VPS system 30, may adapt the presentation of and driver information, such as the predicted time and or optimal route, based on crowd-sensed time context data and/or crowd-sensed location context data.

With continuing reference to FIG. 2, method 100 also includes process block 141, which may be representative of an "ON State Receive Handler" module that is periodically, systematically and/or continuously invoked when the vehicle ignition is active. In any such instance, vehicle location and context data is received from the vehicle 10, as previously indicated at process block 109. The method 100 then proceeds to process block 143 to execute a Do Map Match procedure, which includes performing a map matching operation that takes as input, e.g., current GPS location data (latitude and longitude coordinates), and returns a reference location (@home, @work, etc.). This information may be stored in and/or based upon data retrieved from the POI database 117. A trip context evaluation, as described above, is performed at process block 145 to predict a preferred route, and a time context evaluation, as described above, is performed at process block 147 to predict an expected trip duration. This information may be stored in and/or based upon data retrieved from the trip database 121.

At process block 149, an optional Context Handler engine may be initiated to vdetermine a specific context—timeliness and location—for a current vehicle location. The VPS system 30 may subsequently analyze crowd-sensed contextual data at process block 151, and then deploy a regional profile that is designed to satisfy one or more identified "needs" of the driver at process block 153. Analyzing received crowd-sensed data, including current and/or previous trip characteristics, may be used to determine a predicted trip duration and/or a predicted trip route. Analyzing may include: first, aggregating received operational data, current trip characteristics, and previous trip characteristics; filtering the data once aggregated; and, storing select portions and purging select portions of the aggregated data. This will allow the system to communicate a consistent data set—with associated resolution and update frequency—that is believed to satisfy the majority of needs for a particular driver location. Such information could be communicated using broadcast approaches (e.g., V2X or XM), or the same data such could be sent to individual subscribers. Such information could be specifically tailored for each individual user; however, such an approach may increase the complexity of the centralized processing server.

Driver interaction can be adapted based on a determination that the driver has time comfort (i.e., "running early") or time pressure (i.e., "running late"). When a time comfort condition is detected, the system may reinforce the time comfort condition by communicating this fact to the driver (alleviating any fears of "running late"). Additionally, the system may provide a recommendation based on a vehicle condition and outside crowd-sourced information, such as a low fuel condition combined with a fuel station that has a large number of available pumps. When a time pressure condition is detected, the system may employ various methods to minimize driver distraction or anxiety, including, but not limited to, providing messages that calm the driver's mood (e.g., "you are not running that late", "don't follow too close"), automatically adapting the vehicle safety settings to provide increased protection for a potentially anxious driver or suppressing non-urgent vehicle notifications. The crowd-sense feature HMI may be adapted based on the detected location context. For example, elements of the HMI could include location-based service information if the driver is determined to be on vacation. Likewise, additional real-time traffic elements or arrival time information could be included if the driver is detected to be on the daily commute. The HMI may also be simplified in situations of time anxiety to minimize the driver distraction level.

With reference now to the flow chart of FIG. 3, a representative method or control strategy for a specific use case scenario, namely a "Rough Road" notification example based on location context, is shown in accordance with aspects of the present disclosure. Some or all of the operations illustrated in FIG. 3 and described in further detail below can be representative of an algorithm that corresponds to processor-executable instructions that may be stored, for example, in main or auxiliary or remote memory, and executed, for example, by an on-board or remote ECU, central processing unit (CPU), control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, eliminated, or combined.

The method 200 begins at decision block 201 to determine if the vehicle's engine ignition or motor starter is in an ON state or an OFF state. For at least some embodiments, decision block 201 may be identical to or may comprise any of the features and options described above with respect to decision block 103 of FIG. 2. If the ignition/starter is in an on state (Block 201=ON), method 200 proceeds to process block 203 where a Data Handler of vehicle 10 receives or retrieves context data and sampling instructions from a first cloud server 31 of the VPS system 30. At process block 205, a Context Engine analyzes, for example, crowd-sensed operational data, such as inclement weather conditions, the presence of numerous potholes, slowing traffic, etc., to determine a current driving context. Method 200 then submits vehicle location and context data, at process block 207, to a second cloud server 33 of the remotely located VPS system 30, e.g., where the data is processed, analyzed and stored to determine context and user needs. Data from the context engine of process block 205 is fed to an HMI Policy module of process block 209, and then modified to comport with policy rules and regulations stored in an HMI policy database. At this juncture, the method may determine whether a current trip of the motor vehicle 10 is on commute or off commute, and whether or not the current trip is in a high-severity event; if so, the AV controller 20 may transmit command signals to the AV telematics unit 18 to notify the driver of crowd-sensed potholes to avoid during the commute while driving in inclement weather.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the motor vehicle including a prime mover, a sensor, an electronic user interface (EUI), a vehicle controller governing operation of the EUI, and a vehicle communications system wirelessly connecting the vehicle controller and EUI to a distributed computer network, the method comprising:
   determining, via the vehicle controller based on a signal received from the sensor, if the prime mover of the motor vehicle is in an on state;
   determining, via the vehicle controller responsive to the prime mover being in the on state, current trip characteristics, including start and destination locations, real-time vehicle data specific to the motor vehicle, and driver data specific to a driver of the motor vehicle, for a current trip of the motor vehicle;
   determining, via the vehicle controller, previous trip characteristics including respective duration data and routing data for each of one or more previous trips of the motor vehicle corresponding to the current trip;
   receiving, via the vehicle communications system over the distributed computer network from a vehicle participatory sensing system aggregating data from multiple participative vehicles, operational data, including road surface conditions, traffic conditions, and unexpected driving scenarios, for the current trip as sensed by the participative vehicles;
   analyzing the received operational data with the current trip characteristics and the previous trip characteristics to determine a predicted trip duration and/or a predicted trip route; and
   directing, via the vehicle controller, a safety system of the motor vehicle to change safety settings and/or the EUI to output to the driver of the motor vehicle the predicted trip duration and/or trip route determined from the analyzed operational data.

2. The method of claim 1, further comprising adapting a data fidelity and/or a data sampling frequency of the received operational data based on a determined user expectation of the driver of the motor vehicle and/or a determined aggregate expectation of a group of the participative vehicles.

3. The method of claim 1, further comprising adapting a presentation of the predicted trip duration and/or trip route based on a time context data and/or a location context data, the time context data including a designation of the current trip as either rush hour or midday and either nighttime or daytime, and the location context data including a designation of the current trip as either on commute or off commute and either familiar or unfamiliar.

4. The method of claim 1, wherein the operational data further includes ambient lighting conditions data, weather conditions data, and/or driving intersection data collected by the participative vehicles.

5. The method of claim 1, wherein the vehicle data includes respective operating states for one or more vehicle systems of the motor vehicle during the current trip.

6. The method of claim 1, wherein the driver data includes respective operating characteristics for one or more driving variables of the driver during the current trip.

7. The method of claim 1, wherein the driver data includes an indication that the driver is either a defensive or aggressive driver, either tends to speed or not speed, and/or a number of driving violations for the driver.

8. The method of claim 1, wherein the current trip characteristics for the current trip of the motor vehicle further include a start time, an intended route to reach the destination location from the start location, and/or a current location of the motor vehicle.

9. The method of claim 1, wherein the previous trip characteristics include a respective start time, a respective start location, a respective trip duration and/or a respective destination location for each of a plurality of the previous trips taken by the driver with the motor vehicle.

10. The method of claim 1, further comprising:
    receiving, via the vehicle communications system from the vehicle participatory sensing system, historical trip duration data corresponding to the current trip as sensed by the participative vehicles; and
    directing the EUI to output to the driver of the motor vehicle an indication of whether the current trip of the motor vehicle is predicted to be early, on time, or late based on a comparison of the historical trip duration data and the predicted trip duration.

11. The method of claim 10, further comprising:
    responsive to the current trip of the motor vehicle being predicted to be early, directing the EUI to output to the driver of the motor vehicle an opportunistic route diversion; and
    responsive to the current trip of the motor vehicle being predicted to be late, directing the EUI to output to the driver of the motor vehicle a calming measure, modifying operation a vehicle system to implement increased protection measures, and/or delaying presentation of non-critical information to the driver by the EUI.

12. The method of claim 1, wherein the analyzing includes aggregating the received operational data, current trip characteristics, and previous trip characteristics, filtering the aggregated data, and purging select portions of the aggregated data.

13. The method of claim 1, wherein the EUI is an audiovisual (AV) telematics unit mounted inside a passenger compartment of the motor vehicle, and wherein outputting the predicted trip duration and/or trip route is via the AV telematics unit.

14. A motor vehicle comprising:
    a vehicle body with a passenger compartment;
    a prime mover including an engine and/or a motor;
    an audiovisual (AV) telematics unit mounted within the passenger compartment and operable to transmit audio and/or video information to a driver of the motor vehicle;

a vehicle communications system mounted to the vehicle body and operable to wirelessly connect the AV telematics unit to a distributed computer network; and an AV electronic control unit (ECU) communicatively connected to the AV telematics unit and the vehicle communications system, the AV ECU being programmed to:

determine, via a signal received from a sensor, if the prime mover is in an on state;

responsive to the prime mover being in the on state, determine current trip characteristics, including start and destination locations, real-time vehicle data specific to the motor vehicle, and driver data specific to the driver of the motor vehicle, for a current trip of the motor vehicle;

determine previous trip characteristics including respective duration data and routing data for each of multiple previous trips of the motor vehicle corresponding to the current trip;

receive, via the vehicle communications system from a vehicle participatory sensing system aggregating data from multiple participative vehicles, operational data, including road surface conditions, traffic conditions, and unexpected driving scenarios, for the current trip as sensed by the participative vehicles;

analyze the received operational data with the current trip characteristics and the previous trip characteristics to determine a predicted trip duration and/or a predicted trip route; and     direct a safety system of the motor vehicle to change safety settings and/or the AV telematics unit to output to the driver of the motor vehicle the predicted trip duration and/or trip route determined from the analyzed operational data.

15. The motor vehicle of claim 14, wherein the AV ECU is further programmed to adapt a data fidelity and/or a data sampling frequency of the received operational data based on a determined user expectation of the driver of the motor vehicle and/or a determined aggregate expectation of a group of the participative vehicles.

16. The motor vehicle of claim 14, wherein the AV ECU is further programmed to adapt a presentation of the predicted trip duration and/or trip route based on a time context data and/or a location context data, the time context data including a designation of the current trip as either rush hour or midday and either nighttime or daytime, and the location context data including a designation of the current trip as either on commute or off commute and either familiar or unfamiliar.

17. The motor vehicle of claim 14, wherein the operational data further includes ambient lighting conditions data, weather conditions data, and/or driving intersection data collected by the participative vehicles.

18. The motor vehicle of claim 14, wherein the vehicle data includes respective operating states for one or more vehicle systems of the motor vehicle during the current trip, and wherein the driver data includes respective operating characteristics for one or more driving variables of the driver during the current trip.

19. The motor vehicle of claim 14, wherein the AV ECU is further programmed to: receive, via the vehicle communications system from the vehicle participatory sensing system, historical trip duration data corresponding to the current trip as sensed by the participative vehicles; and display, via AV telematics unit, an indication that the current trip of the motor vehicle is predicted to be either early, on time, or late based on a comparison of the historical trip duration data and the predicted trip duration.

20. The motor vehicle of claim 19, wherein the AV ECU is further programmed to:

responsive to the current trip of the motor vehicle being predicted to be early, display, via AV telematics unit, an opportunistic route diversion; and     responsive to the current trip of the motor vehicle being predicted to be late, display, via AV telematics unit, a calming measure, modifying operation a vehicle system to implement increased protection measures, and/or delaying presentation of non-critical information to the driver by the AV telematics unit.

* * * * *